United States Patent [19]

Frayer, Jr. et al.

[11] Patent Number: 4,625,567
[45] Date of Patent: Dec. 2, 1986

[54] METHOD AND APPARATUS FOR THE MEASUREMENT OF BEARING LOADS USING A DUCTILE WIRE INSERT

[75] Inventors: Robert W. Frayer, Jr., Canton; Douglas Glover, Ann Arbor, both of Mich.

[73] Assignee: Federal-Mogul Corporation, Southfield, Mich.

[21] Appl. No.: 723,420

[22] Filed: Apr. 15, 1985

[51] Int. Cl.⁴ .............................. G01L 1/06; G01L 5/16
[52] U.S. Cl. ................................ 73/862.04; 73/862.53; 73/862.54
[58] Field of Search ............ 73/492, 762, 787, 862.04, 73/862.49, 862.53, 862.54; 116/212

[56] References Cited

U.S. PATENT DOCUMENTS 2,370,784  3/1945  Edwards ...................... 73/862.53 X
2,472,108  6/1949  Hickman .......................... 73/862.53
4,203,319  5/1980  Lechler .......................... 73/862.04 X
4,341,122  7/1982  Lechler et al. .................... 73/862.04

FOREIGN PATENT DOCUMENTS

2616075  11/1977  Fed. Rep. of Germany ... 73/862.54

Primary Examiner—Charles A. Ruehl
Attorney, Agent, or Firm—Robert F. Hess; Lawrence J. Shurupoff

[57] ABSTRACT

A test bearing is adapted from a standard production bearing for recording the location and magnitude of load applied to the bearing when installed and operated in its intended environment. A groove is typically formed in the stationary raceway of a cylindrical or tapered roller bearing and a relatively soft ductile wire is inserted into the groove. A plurality of axially spaced circumferential grooves may be fitted with wires for the determination of any potentional misalignment of the bearing. The bearing is then operated under normal conditions such that the inserted wires are plastically deformed. The extent of plastic deformation of the wire provides an accurate indication of the loading of the bearing.

14 Claims, 24 Drawing Figures

WIRE DEFORMATION vs. BEARING LOAD

*Fig-7*

ROLLER LOAD DISTRIBUTION
TOTAL BEARING LOAD = T
$T = N_0 + 2V_1 + 2V_2$

*Fig-8*

WIRE DEFORMATION vs. ROLLER LOAD

LOAD = $(1.57 \times 10^7) \times$ (DEFORMATION) + 2986

TOTAL VERTICAL LOAD = V6.9° + V34.6° + V62.3° + V90° + V117.7°
V145.4° + V173.1° + V200.8°
= 52,730 LBS.

METHOD AND APPARATUS FOR THE MEASUREMENT OF BEARING LOADS USING A DUCTILE WIRE INSERT

BACKGROUND OF THE INVENTION

1. Field of the Invention

This invention relates generally to the testing of bearings and more particularly to a test bearing using the plastic deformation of a ductile wire insert to accurately determine bearing loads, load distribution and bearing alignment in various types of bearing applications.

2. Description of Prior Developments

Bearing fatigue life has been conventionally calculated using the bearing operating conditions of load, speed, lubrication and alignment as input parameters for such life expectancy calculations. The ability of a bearing user to accurately define these operating conditions directly affects the accuracy of the fatigue life calculations. While these operating conditions may be well defined in some particular applications, in others they may be unknown or uncertain. In some cases, the actual bearing life experienced in a particular setup or application has been considerably different from the calculated life because of some unexpected loading condition which occurred during the operation of the bearing. In the past, strain gauges were used to measure bearing loads. However, strain gauges are often limited to fixed positions on the bearing and require cumbersome wire leads and/or slip rings. Moreover, the equipment tested frequently had to be modified to accommodate the often awkward and expensive strain gauge setups.

Thus, the need exists for a method and apparatus which will accurately determine bearing loads, load distribution (both circumferential and axial) and bearing alignment in both cylindrical and tapered roller bearing applications as well as most other type of bearing applications where these variables are either unknown or uncertain.

SUMMARY OF THE INVENTION

The invention primarily concerns the modification of a standard production bearing for recording the location and magnitude of load applied to the bearing when installed and operated in a mechanism under study. The invention may be applied to all forms of rolling bearings such as ball, cylindrical, spherical, needle and tapered. The stationary race, outer or inner, is typically modified by machining one or more small circumferential grooves around the raceway. A relatively soft ductile wire is inserted into the groove such that the outer surface of the wire is nearly flush with the raceway surface. The width of the groove is slightly less than the diameter of the wire. Typically, three circumferential grooves will be sufficient to record the major load and any misalignment loads.

Next, the bearing is assembled and installed in the mechanism under study. The mechanism is then operated under the conditions that gave the unpredictable bearing life, or any other operating conditions of interest. After a short time of operation the test bearings are removed and disassembled. During operation the soft wires which were inserted into the grooves will be plastically deformed by the rolling elements such that they are now plastically deformed below the raceway surface. The depth of the wire is measured at regular intervals around the race. This depth of the wire below the raceway surface is proportional to the applied load.

The magnitude of the load applied to the tested bearing can be determined by comparison to similarly prepared bearings that are run in a laboratory bearing tester where the loads and other conditions are accurately controlled. Generally, a series of tests at a variety of loads would be conducted in the laboratory tester to establish the relationship of the load to the depth of the wire below the raceway surface.

The present invention has been developed to meet the needs noted above and accordingly has as its object the precise measurement of various bearing operating parameters which are determined in the actual intended application environment of the bearing thereby providing the bearing user with the ability to more accurately predict bearing fatigue life.

Another object is the provision of a method and apparatus which will allow the analysis of bearing loads in situations where bearing life is unexpectedly shortened due to unknown reasons.

Still another object is to provide a method and apparatus which can be used by both the bearing manufacturer and bearing user to optimize the bearing application system. The bearing manufacturer can use information on loads and loads distribution to optimize the bearing and its internal geometry for its intended application. The user can further use alignment and load sharing and distribution information to evaluate the system's structural rigidity.

It is yet another object to provide the following information about the mechanism under study from the measurements of the wire depth around the raceway on each wire:

1. The magnitude of the load around the race.
2. The location of the maximum load.
3. The location and magnitude of any misalignment in the bearings.
4. The determination of any distortion of the bearing support housing based upon the load pattern around the bearing.
5. The provision of sufficient information to calculate the bearing life in the apparatus under study based upon the maximum load in any location of the bearing and the bearing misaligment.

The method of the invention is simple and virtually without limitations as to its applicability in terms of the system complexity in which it can be used. Since modifications to the application system are not required for its use, the method of present invention is likely to be more accurate than those techniques where modifications which might influence the bearing loads are required. The ease of use of the present invention, its unlimited range of application and inherent accuracy lends itself to a wide range of potential applications.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein.

DETAILED DESCRIPTION OF THE PREFERRED EMBODIMENTS

Standard production cylindrical and tapered roller bearings are easily converted to test bearings according to the invention by placing wires into circumferential grooves provided within various contacting surfaces of any bearing component contact surface. These circumferential grooves are ground into the contact surface to a width which allows the wire, preferably soft steel wire, to be inserted and yet retained by an interference fit. The groove depth is controlled to ensure that the wire surface is slightly above the raceway or contact surface after installation. The steel wire is cut to length and then installed by rolling it into the grooves.

The diameter of the wire insert is ideally kept small to minimize any effects on the load carrying characteristics of the bearing. Tests have been successfully run using a standard 1/16 (0.062) inch copper coated steel welding wire pressed into grooves ground to a width of 0.060 inch and to a depth of 0.061 inch.

The contact surfaces which include the inner race, outer race or even the rollers of a bearing can each be manufactured with preferably circumferentially extending ductile wire inserts. Typically however, the race which is stationary in the application is modified with the wire inserts. The stationary race allows the user to measure circumferential load distribution and to calculate the total bearing load. Since the complete circumference of the rotating race and rollers is exposed to the same maximum load, the maximum load would be the only value which could be measured from ductile wire inserts in these rotating components.

The number of wire inserts and their axial location along the track or raceway can be varied to meet the needs of the user. Typical test bearings have three wire inserts spaced axially along the stationary track. One wire insert is located in the center of the track and one wire insert is located between the center of the track and each of the two edges of the raceway. The center wire insert is the best indicator of load and circumferential load distribution on an aligned raceway surface. The two end wire inserts are the best indicators of the axial alignment of the bearing.

The wire inserts take a permanent set when the yield strength of the wire material is exceeded. This permanent set of the wire, in cotnrast to the spring back of the raceway surface to its original unloaded position, results in a difference in height between the insert wire and the raceway surface. It is this difference in height after the bearing has been loaded which is used to evaluate the load, load distribution and axial alignment of the bearing.

Figure 1:
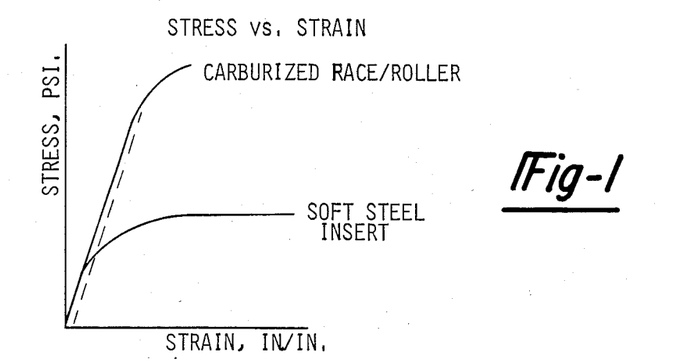
FIG. 1 is a stress-strain curve comparing the yield strengths of a hardened steel bearing race and a soft steel wire insert.

The difference in height between the two surfaces is a result of the difference in yield strength between the two materials. This difference in yield strength is represented schematically on the stress strain curves of FIG. 1. The hardened steel race has a yield strength of approximately 580,000 psi while that of the soft steel wire inserts is approximately 72,000 psi. This wide range in yield strengths results in a wide range of load conditions where the test bearing can be used.

Figure 2A:
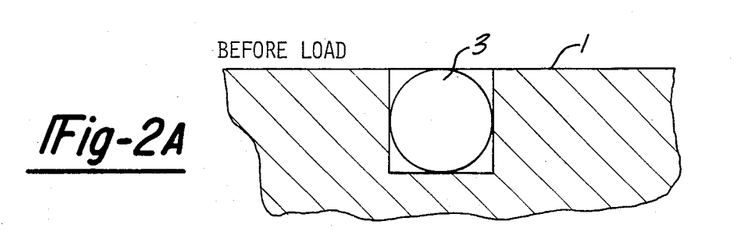
FIG. 2A is a schematic axial cross sectional view takan through the bearing race before testing.
Figure 2B:
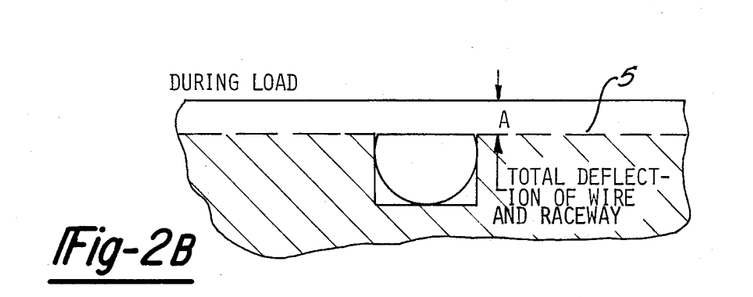
FIG. 2B is a subsequent view of FIG. 2A during test loading.
Figure 2C:
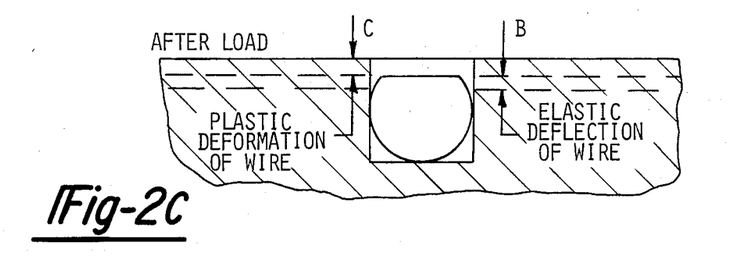
FIG. 2C is a subsequent view of FIG. 2B after the load has been removed from the bearing.

The deflection of a raceway surface (1) and a wire insert (3) is graphically depicted in FIGS. 2A, 2B and 2C. As shown in FIG. 2A, the race and wire surfaces are substantially flush at the start of the test. In FIG. 2B, the race and wire surfaces are deflected a distance "A" to some new level (5) under the test load. The wire insert in this position does not provide support for the load, but rather yields to whatever level the supporting raceway moves.

In FIG. 2C, the load has been released. Since the stress of the applied test load was lower than the yield strength of the race material, the raceway surface has completely elastically returned to its original unloaded position. However, the wire has not returned to its original unloaded position since its yield strength has been exceeded. The total deflection of the wire under load is made up of both an elastic and plastic component labeled "B" and "C", respectively, in FIG. 2C. The elastic deflection will remain the same for all stresses exceeding the yield strength of the wire. It is the plastic deformation of the wire which varies with load and gives one the ability to distinguish between different levels of load.

Figure 3:
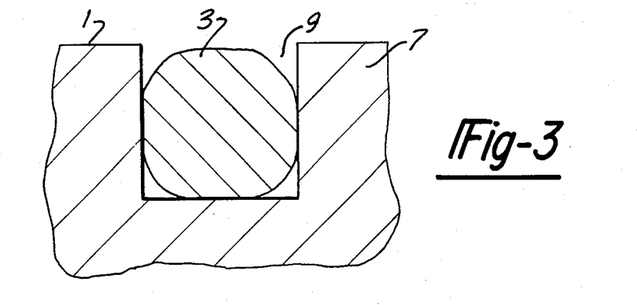
FIG. 3 is a cross sectional view reproduced from a photograph of a wire insert after having been subjected to a test load.

A schematic representation of an actual photograph of a sectioned raceway (7) after testing is shown in FIG.

3. The top, sides and bottoms of the wire insert (3) have been flattened during insertion of the wire into the raceway groove (9) but there is little visible evidence of the wire being plastically deformed because of the applied bearing load.

The magnitude of the wire deformation is only in terms of 0.0001 of an inch. Maximum wire deformations would typically be less than 0.0020 inch. These small deformations require an accurate, repeatable method of measurement. This is done using an electronic surface profile recorder such as a proficorder which uses a stylus to traverse the bearing test surface and a strip chart recorder to make a record of the vertical and horizontal movement of the stylus as it moves over the bearing.

Figure 4A:
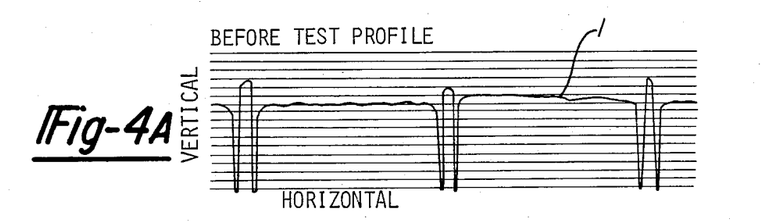
FIG. 4A is a proficorder chart recording of the profile of the surface of the bearing element before test loading.
Figure 4B:
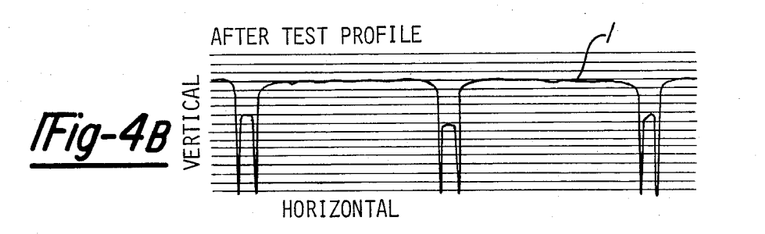
FIG. 4B is a subsequent recording taken along the same surface as in FIG. 4A after the bearing element has been tested and the load removed.
Figures 4C, 4D:
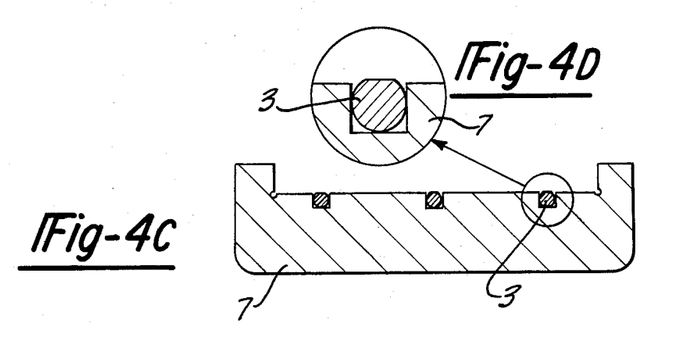
FIG. 4C is a schematic view of a test bearing race fitted with three wire inserts.
FIG. 4D is a fragmental enlarged view of one of the wire inserts shown in FIG. 4C

A set of traces of raceway and wire profiles before and after testing is shown in FIGS. 4A and 4B, respectively. The round wire is distorted on each trace as a result of a 200 to 1 difference in vertical to horizontal magnification. This difference in magnification is necessary to keep the length of the trace short by reducing horizontal distances while allowing one to easily discern differences of 0.0001 of an inch in vertical height between the raceway or track surfaces and the wire surfaces. FIGS. 4C and 4D show a test setup from which the plots of FIGS. 4A and 4B may be obtained.

The wire deformations from a test bearing can be converted to load values using a calibration equation. This calibration equation, which relates wire deformation to load for a specific bearing size, is developed empirically on test machines where bearing operating conditions can be precisely controlled.

Figure 5:
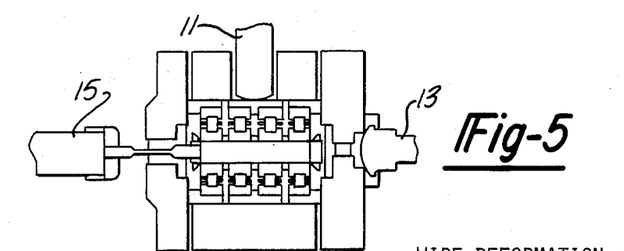
FIG. 5 is a schematic elevational view, partly in section of a bearing testing machine.
Figures 9, 10, 11, 12:
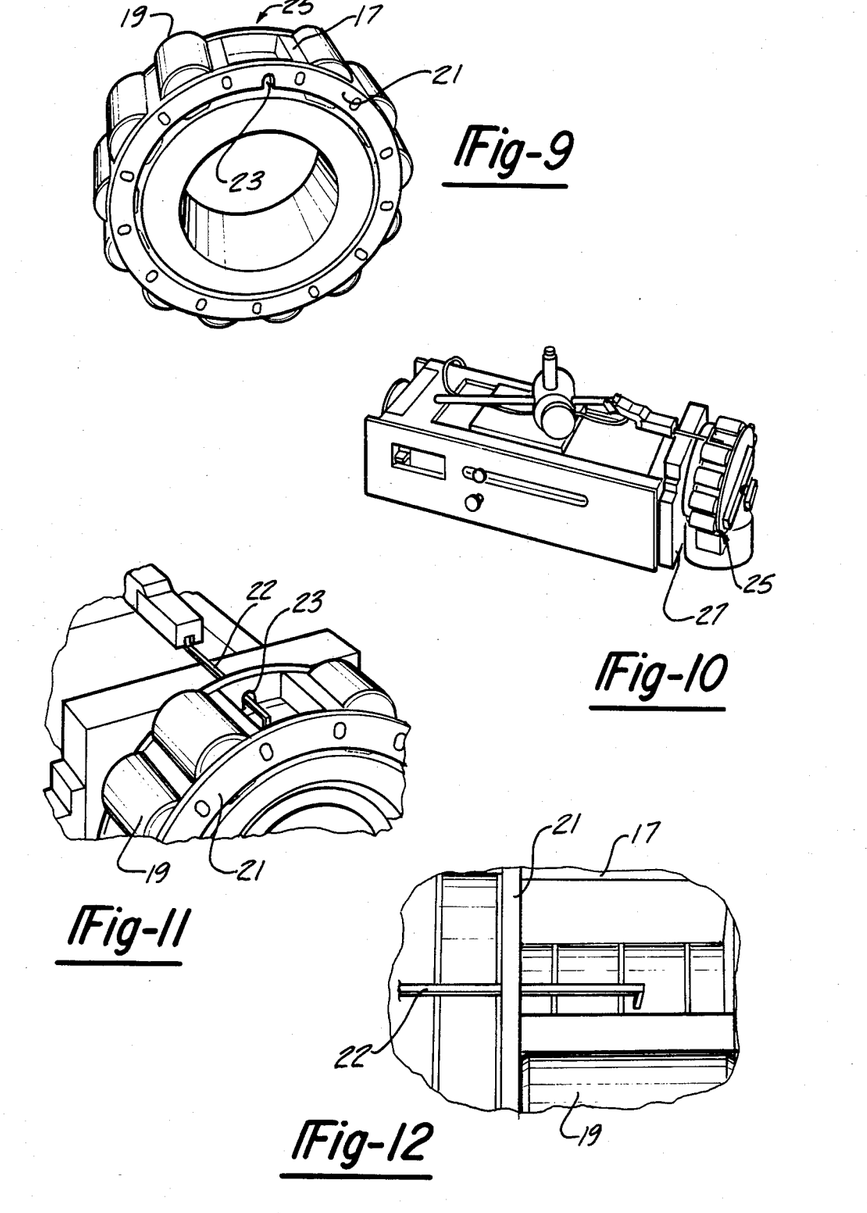
FIG. 9 is a perspective view of a roller bearing modified in accordance with the invention.
FIGS. 10, 11 and 12 are perspective views of the setup equipment used for measuring the test bearings.

Endurance test machines have been used to empirically develop calibration data. An example of such a machine is schematically shown in FIG. 5. This machine provides precise control of not only the bearing loads through the use of a radial load actuating cylinder (11), but also the bearing speed, lubrication temperature and alignment. For calibration, the bearing load, which is applied via a hydraulically actuated deadweight system, is varied and measurements of the wire deformations are taken after each load increment. A thrust load actuating cylinder (13) and a controlled drive source (15) provide additional known parameters for accurate measurement and calibration.

Figures 6, 7, 8:
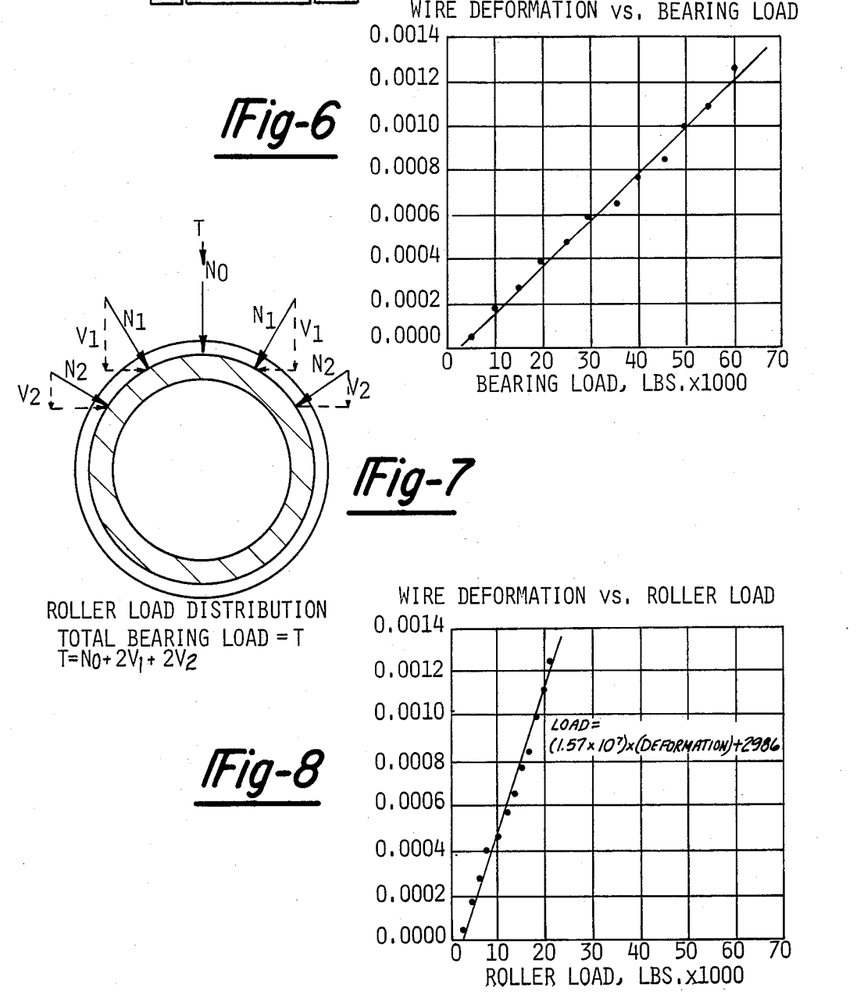
FIG. 6 is a graph depicting wire deformation as a function of bearing load.
FIG. 7 is a schematic cross sectional view of a bearing under load showing roller load distribution at the contact points of the rollers.
FIG. 8 is a plot of wire deformation as a function of maximum roller load derived from the graph of FIG. 6.

The bearing load and wire deformation data obtained from the test machine of FIG. 5 is plotted and fitted to an equation. A plot of such a series of tests is shown in FIG. 6. The bearing load to wire deformation relationship for this particular set of data is defined by a straight line which intersects the abcissa at a bearing load of 2,986 lbs. and has a slope of $2 \times 10^{-8}$ in./lb. There is no permanent wire deformation for applied bearing loads less than 2.986 lbs. It is only at bearing loads higher than this that the yield strength of the wire insert is exceeded. This minimum load for permanent deformation of the wire will vary for different size bearings. The wire and race deflection at this point of permanent wire deformation, however, will not vary and can be approximated by using Hooke's law. The calculation will be close, but will not be quite accurate, since stress is not directly proportional to strain near the yield strength.

STRAIN AT YIELD=YIELD STRENGTH/MODULUS OF ELASTICITY
STRAIN AT YIELD=72,000 PSI/30,000,000 PSI
STRAIN AT YIELD=0.0024 in/in
WIRE DEFLECTION=STRAIN AT YIELD X WIRE THICKNESS
WIRE DEFLECTION=0.0024 in/in X 0.060 in
WIRE DEFLECTION=0.00014 in

The race and wire will be deflected 0.00014 inch before the wire begins to be permanently deformed. This is true for the first load sequence as well as for all subsequent load sequences. As a result, the deflected wire and race surface during loading is actually deformed 0.00014 in. below that of the measured wire deformation.

The relationship of applied bearing load to wire deformation, as developed in the calibration equation, is valid only for bearings that are of the same geometry as those tested and are loaded in the same way as was done on the bearings used in the test machine where the data was generated. The single point radial load of the endurance test machine results in a symmetrical roller load distribution around the race, as shown in FIG. 7. The individual roller loads, $N_0$, $N_1$, $N_2$, which are normal to the bearing surface, result in the measured permanent deformation of the wire at each circumferential location. The maximum normal roller load will be at position $N_0$. Since the roller loads are directly related to the specific wire deformations, it is useful to have the calibration equation in terms of roller load rather than applied bearing load. Applied bearing load is easily translated into terms of maximum roller load knowing the geometry of the bearing.

For example, by using basic static force equations, the applied bearing load can be resolved into the various distributed individual loads on each of the rollers which are located at positions $N_0$, $N_1$, $N_2$ etc., around the raceway. The overall maximum roller load $N_0$, occurs at the 12 o'clock position in FIG. 6 under vertical loading conditions. The data as translated from FIG. 6 through static load analysis is shown in FIG. 8 and its equation is approximated by:

MAXIMUM ROLLER
LOAD=$(1.57 \times 10^7) \times$ Deformation+2,986

This equation can now be used to determine maximum roller loads from wire deformations at each circumferential point of measurement.

The extent of modification to the test bearings, prior to installation in the application, that is, in the specific intended mechanism in which the production bearings will operate, depends on the needs of the user. These needs determine which component will have ductile test wires inserted and how many wires will be requried. If only one test load is of interest, then the bearing can be disassembled after one test without consideration for the need to reassemble and test again. It is more typically, however, to run multiple loads on the same test bearing while taking measurements between each load increment. For a race and roller assembly which is not separable, special modifications to the retainer would probably be required to allow for intermediate test measurements.

A cylindrical roller bearing which was modified for intermediate measurements is shown in FIG. 9. Two retainer modifications were required to make the measurements possible. First, a retainer rib (17) was modified to allow for the radial removal of a roller (19). This was accomplished by removing a section of the rataainer rib which retains the roller during handling. The modified retainer rib allows a roller in that one pocket to be removed and reinserted with a small radial force. The roller does not contact this part of the rib during operation and the modification has no influence on the bearing performance.

Secondly, a retainer end plate (21) was modified so that the proficorder stylus (22) (FIG. 12) could reach the raceway. This modification consisted of a slot (23) in one end plate. The slot was located at the center of the roller pocket which had been modified to allow for removal of the roller. This modified bearing and the equipment used for measurement is shown in FIGS. 10, 11 and 12. The bearing (25) is shown mounted on a fixture (27) which allows precise axial location identification and circumferential indexing of the bearing inner race during repeated measurements.

The test bearings, when placed in use, directly replace the standard application bearings and are installed using standard procedures. The test bearings however, are indexed in the test application so that both the axial and circumferential orientation of the test bearing can be related back to bearing load distribution and alignment. Circumferential indexing is also important for reinstallation of the bearing if more than one load is to be run as indexing allows the bearing to be replaced in the same position from which it was removed.

Once up to load, only a single load cycle on the test bearing is required to deform the wire inserts. However, the test application is typically run long enough to ensure that the system has reached equilibrium. Extended running time is avoided to prevent possible fatigue damage to the test bearing.

Figure 13:
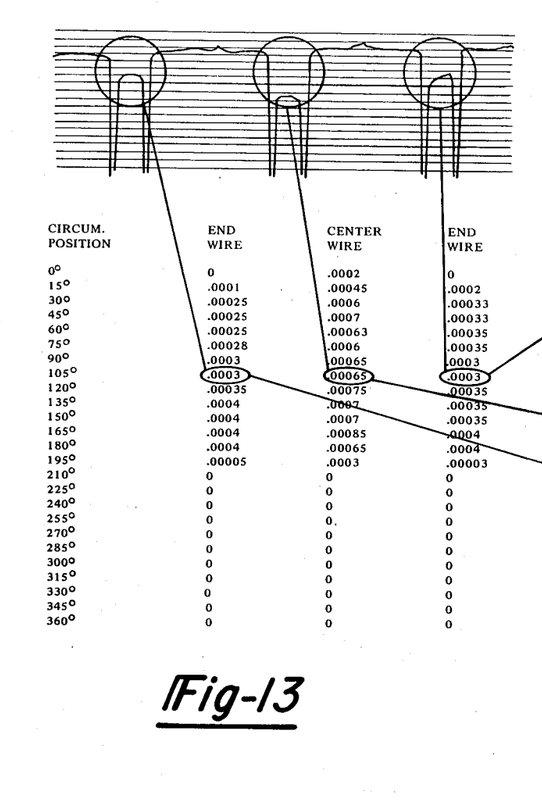
FIGS. 13 and 14 are graphical and tabular representations of data collection and translation in accordance with the invention.
Figure 14:
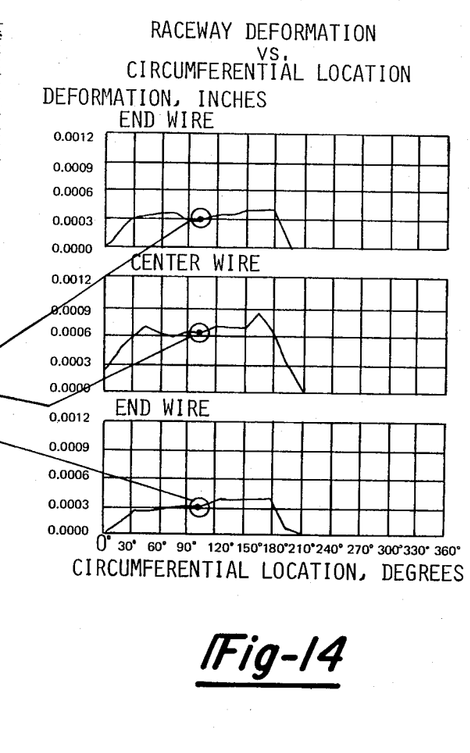

The wire deformation, for each load and at each circumferential location, is determined from strip chart recorder traces as previously shown in FIGS. 4A and 4B. When converted to load values using the calibration equation, and plotted, one can observe the circumferential load distribution. The process of data observation, translation and plotting is shown in FIGS. 13 and 14 for a set of test data. The load distribution is shown to extend beyond 180 degrees and peaks in value near the ends of the load zone. This is in contrast to a simple single point load application where the load zone is contained within 180 degrees and peaks in value at the center of the load zone as indicated in FIG. 7.

Figures 17, 17A, 17B:
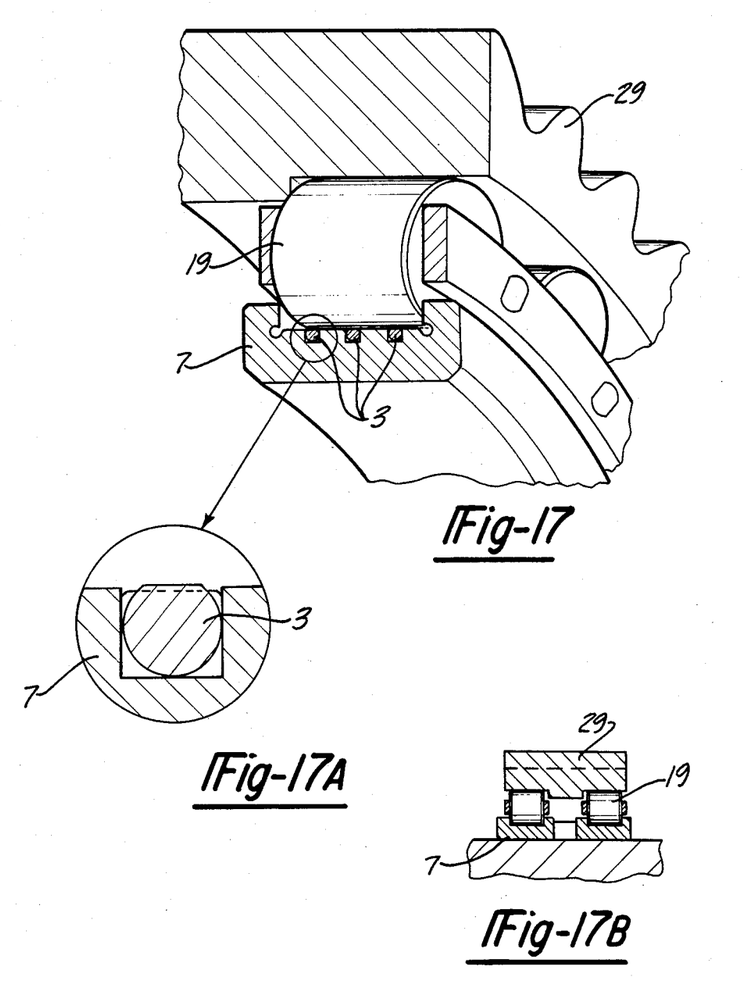
FIG. 17 is a schematic perspective fragmented view of an actual test setup from which the data shown in FIGS. 13 through 16 was derived.
FIG. 17A is an enlarged fragmental view of a wire insert showing the deformation of the insert in phantom.
FIG. 17B is a partial sectional view taken through the setup of FIG. 17.

The load distribution depicted by this particular set of test data is a result of a two point load zone where the bearing is mounted in a housing which is deflecting under load and actually is wrapping around the bearing. The actual application under which this test was conducted is shown in FIGS. 17, 17A and 17B. The housing which deflected was a planetary gear (29) whose inner surface formed the outer bearing raceway of a roller bearing. The potential uniqueness of the load distribution in any application necessitates that the analysis be in terms of individual roller loads rather than applied bearing loads.

Figure 15:
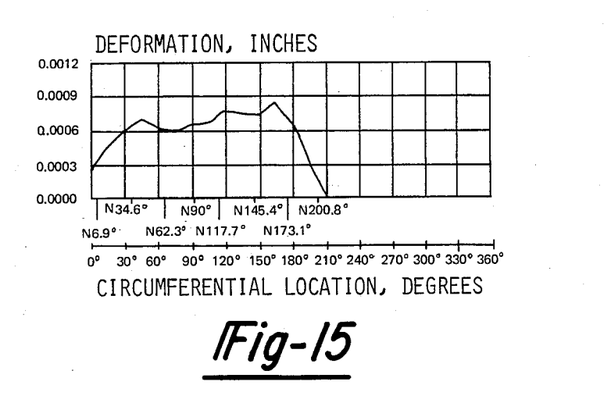
FIGS. 15 and 16 depict a roller load evaluation taken from an actual test application.
Figure 16:
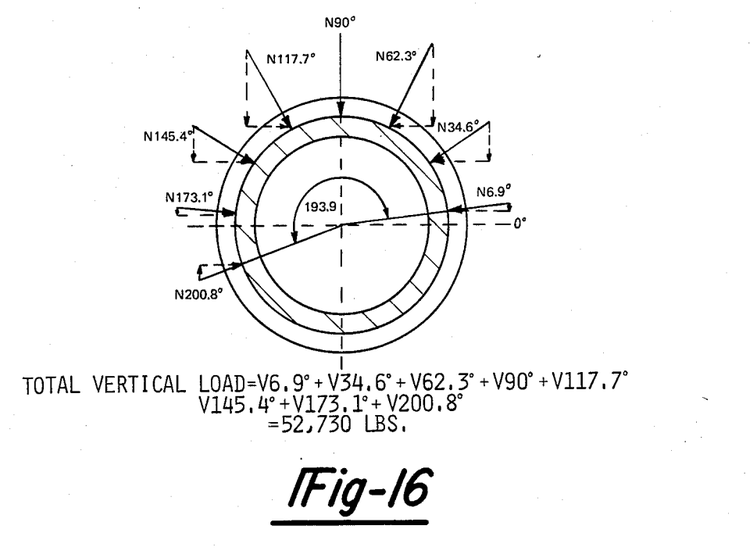

The roller load distribution obtained from FIGS. 13 and 14 is used to determine the applied bearing load in actual use. A circumferential roller set orientation is assumed and the normal roller load corresponding to each circumferential roller location is determined from the load distribution plot such as shown in FIG. 15. The roller loads "N" are then broken down into both horizontal and vertical load components as depicted by the phantom vector components in FIG. 16. The sum of the vertical components is equivalent to the radial load applied to the bearing and can be used in the analysis of bearing life for the particular application being tested. The analysis of the test data previously referenced is shown in FIG. 16. The vertical components from this particular test sum to 52,730 lbs.

The bearing raceway alignment is critical to the analysis of the application bearing life. Multiple wires, which are spaced axially across the raceway, are used for alignment determination. An axial end-to-end difference in wire deformation is indicative of an end-to-end difference in loading which results from a misalignment of the bearing races. The magnitude of misalignment cannot be directly determined from the wire deformations.

Figure 18:
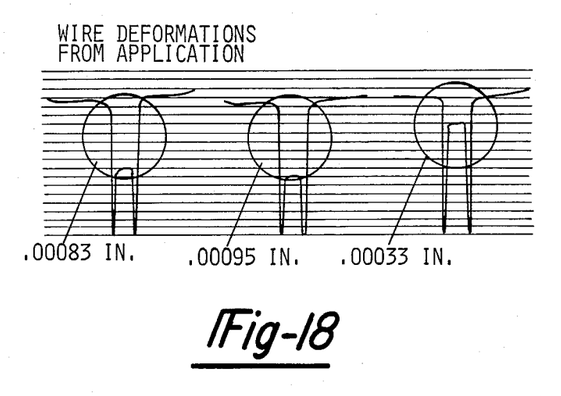
FIGS. 18 and 19 are proficorder plots of the wire deformations from an actual application and from a test machine, respectively, which are used for comparison purposes to determine bearing misalignment.
Figure 19:
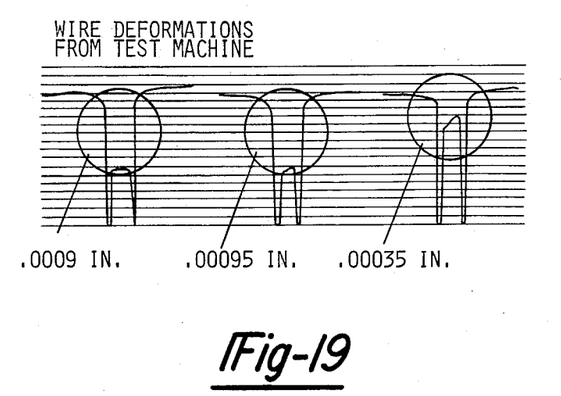

The data shows only the misalignment of the one bearing race while the total bearing misalignment should be stated in terms of inner race misaligment relative to outer race misalignment. A technique to evaluate misalignment duplicates a pattern of deformation obtained from an application on a test machine and then measures from the test machine the applied bearing load and actual misalignment. The wire deformation pattern in FIGS. 18 and 19 is taken from an application where the misaligment was confirmed on test equipment. The misalignment in this particular case was determined to be 4 minutes and 49 seconds.

The test bearing has been used to accurately determine bearing load distribution, applied bearing load and bearing raceway misaligment. The absence of modification to the application installation makes for an inherently accurate measurement. While this technique is ideally suited for those complex applications where typical approaches to measurement would be impossible or prohibitively expensive, its ease of use makes it viable for even routine measurements.

Obviously numerous modifications and variations are possible in light of the above teachings. It is therefore to be understood that within the scope of the appended claims, the invention may be practiced otherwise than specifically described herein.

What is claimed is:

1. A test bearing for measuring bearing load, comprising:

a bearing member having at least one recess formed therein, and comprising a material having a predetermined yield strength; and at least one insert member provided in said recess of said bearing member, said insert member comprising a material having a yield strength less than said predetermined yield strength of said material of said bearing member, such that loading of said test bearing elastically deforms said bearing member and plastically deforms said insert member, and such that plastic deformation of said insert member provides an indication of said bearing load.

2. The test bearing of claim 1 wherein said bearing member comprises a bearing raceway.

3. The test bearing of claim 1 wherein said insert member comprises a metal wire.

4. The test bearing of claim 3 wherein said bearing member comprises a bearing raceway and wherein said at least one recess comprises at least one circumferential groove formed within said raceway.

5. The test bearing of claim 1 wherein said at least one recess comprises a plurality of recesses and wherein said at least one insert member comprises a plurality of insert members provided in said plurality of recesses.

6. The test bearing of claim 5 wherein said bearing member comprises a bearing raceway, wehrein said plurality of recesses comprises a plurality of circumferential groves formed around said raceway, and wherein said plurality of insert members comprises a plurality of metal wires.

7. The test bearing of claim 5 wherein said bearing member comprises a cylindrical bearing raceway, and wherein said plurality of recesses comprises a plurality of circumferential grooves axially spaced along said cylindrical bearing raceway.

8. The test bearing of claim 1 wherein said bearing member comprises a bearing roller.

9. A method for determining bearing loads in a bearing application system using a test bearing having an insert member which plastically deforms during testing, said method comprising:
installing said test bearing in said system;
operating said system so as to test load said test bearing and cause plastic deformation of said insert member;
measuring the amount of said plastic deformation; and
calculating said bearing test load based on the amount of plastic deformation of said insert member.

10. The method of claim 9 which further comprises:
providing a calibration bearing having a calibration insert member, said calibration bearing and calibration insert member having substantially the same geometry as said test bearing and said test bearing insert member;
empirically testing said calibration bearing and said calibration insert member under controlled operating conditions including a plurality of predetermined controlled bearing loads so as to plastically deform said calibration insert member;
measuring the amount of plastic deformation of said calibration insert member; and
calibrating each one of said plurality of controlled bearing loads with the corresponding amount of plastic deformation of said calibration insert member to determine a standard relationship between said bearing loads and said plastic deformation of said test bearing insert member.

11. The method of claim 10 wherein the calculation of said test bearing test load is further based on said standard relationship between said bearing loads and said plastic deformation of said insert member.

12. The method of claim 9 wherein said test bearing further comprises a plurality of insert members axially spaced along said test bearing and circumferentially extending around said test bearing, and wherein said method further comprises:
mesuring the amount of said plastic deformation at a plurality of predetermined points on each one of said plurality of insert members; and
calculating the load distribution around said bearing based on the amount of said plastic deformation at each one of said plurality of predetermined points.

13. The method of claim 12, which further comprises calculating the total applied load on said bearing based on said calculated load distribution.

14. The method of claim 12, which further comprises calculating any misalignment of said test bearing as installed within said application system by comparing the amount of said plastic deformation between each one of said plurality of predetermined points on each one of said plurality of insert members.

* * * * *